US009127600B2

(12) United States Patent
Coldren et al.

(10) Patent No.: US 9,127,600 B2
(45) Date of Patent: Sep. 8, 2015

(54) METHOD AND APPARATUS FOR GENERATING USEFUL WORK FROM THE VENT GAS OF A DUAL FUEL INTERNAL COMBUSTION ENGINE

(75) Inventors: Dana R. Coldren, Secor, IL (US); Joshua Wayne Steffen, Mountain View, CA (US)

(73) Assignee: Caterpillar Inc., Peoria, IL (US)

( * ) Notice: Subject to any disclaimer, the term of this patent is extended or adjusted under 35 U.S.C. 154(b) by 708 days.

(21) Appl. No.: 13/527,004

(22) Filed: Jun. 19, 2012

(65) Prior Publication Data

US 2013/0333668 A1 Dec. 19, 2013

(51) Int. Cl.
| | |
|---|---|
| *F02M 21/02* | (2006.01) |
| *F02D 19/10* | (2006.01) |
| *F02M 37/04* | (2006.01) |
| *F02M 43/00* | (2006.01) |
| *F02M 53/02* | (2006.01) |
| *F02M 55/00* | (2006.01) |
| *F02D 19/06* | (2006.01) |

(52) U.S. Cl.
CPC ............... *F02D 19/10* (2013.01); *F02D 19/06* (2013.01); *F02M 37/04* (2013.01); *F02M 43/00* (2013.01); *F02M 53/02* (2013.01); *F02M 55/00* (2013.01)

(58) Field of Classification Search
CPC .............................. F02B 43/00; F02M 21/02
USPC ......... 123/525, 527, 575, 576, 577, 578, 457, 123/458
See application file for complete search history.

(56) References Cited

U.S. PATENT DOCUMENTS

| | | | |
|---|---|---|---|
| 7,373,931 B2 | 5/2008 | Lennox et al. | |
| 8,936,009 B2* | 1/2015 | Puckett et al. | ............... 123/525 |
| 8,955,444 B2* | 2/2015 | Foege | ......... 105/26.05 |
| 8,960,100 B2* | 2/2015 | Foege et al. | ............... 105/26.05 |
| 2014/0165568 A1* | 6/2014 | Foege | ............ 60/698 |

* cited by examiner

*Primary Examiner* — Thomas Moulis
(74) *Attorney, Agent, or Firm* — Miller, Matthias & Hull LLP

(57) ABSTRACT

An engine system is disclosed that combusts both gaseous and diesel fuels. The system includes a diesel reservoir in communication with an internal combustion engine via a diesel rail. The system also includes a liquefied gaseous fuel reservoir in communication with the internal combustion engine via a gaseous fuel rail. The gaseous fuel and diesel rails both are in communication with a pressure control device. The pressure control device measures the pressure differential between the gaseous fuel and diesel rails. If the pressure differential exceeds a desired range, the pressure control device vents gaseous fuel from the gaseous fuel rail to a spark ignited engine, where the vent gas is used as fuel. The spark ignited engine then converts the vented gaseous fuel to useful work.

21 Claims, 2 Drawing Sheets

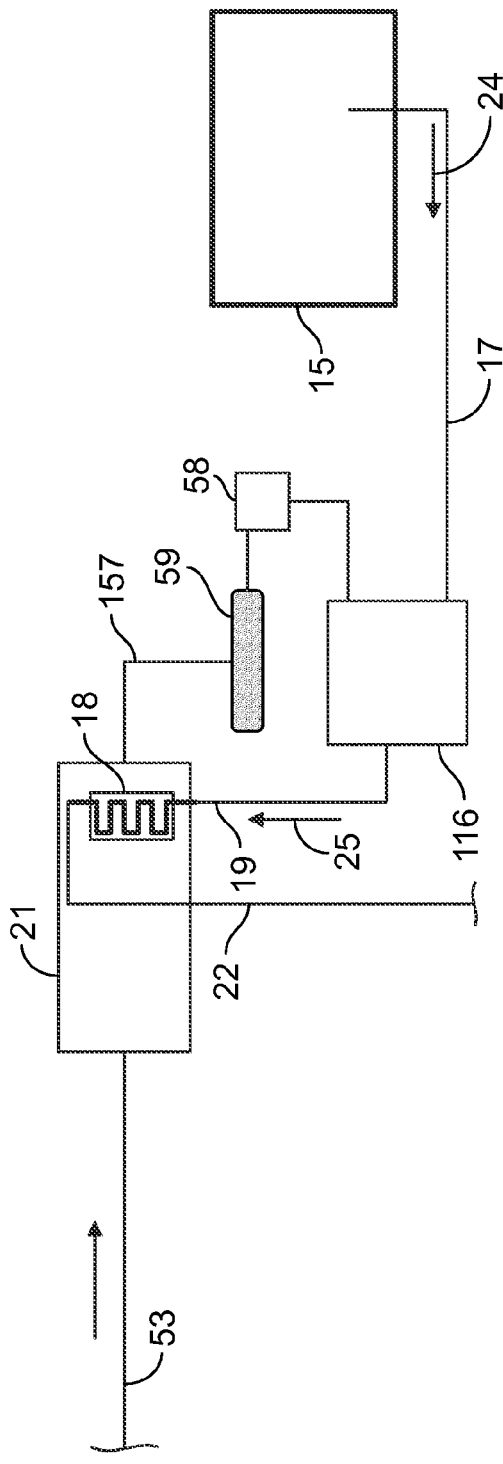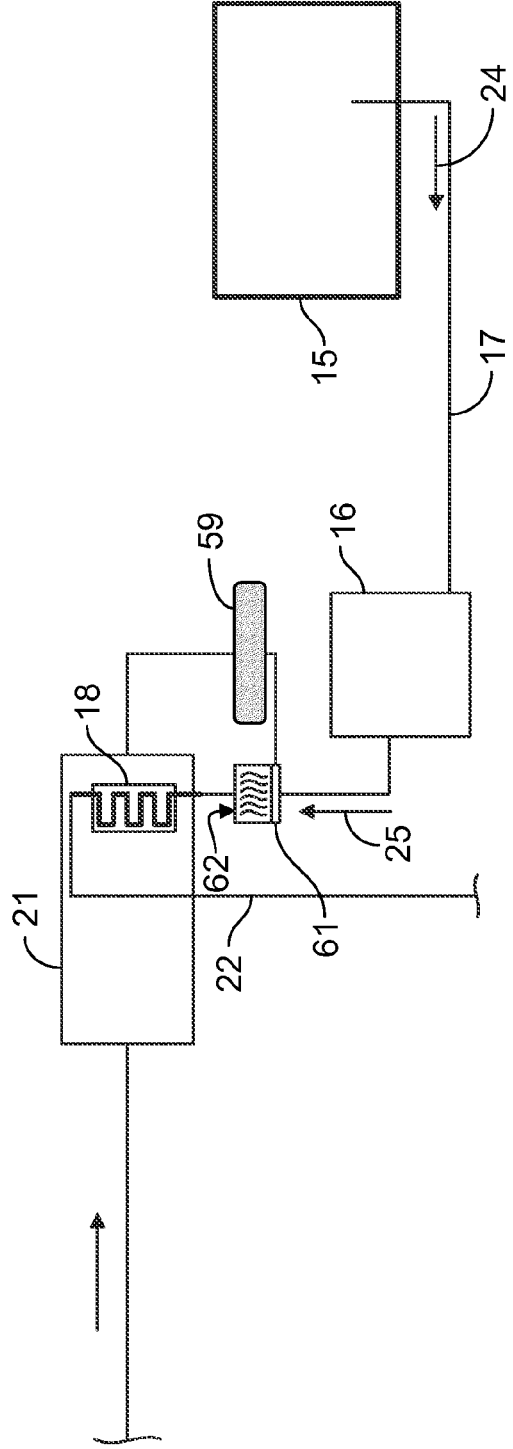

METHOD AND APPARATUS FOR GENERATING USEFUL WORK FROM THE VENT GAS OF A DUAL FUEL INTERNAL COMBUSTION ENGINE

TECHNICAL FIELD

This disclosure relates to an apparatus and method for delivering two fuels to an internal combustion (IC) engine. More specifically, this disclosure relates to a high pressure direct injection (HPDI) fuel system that delivers both a gaseous fuel and liquid diesel fuel to an IC engine.

BACKGROUND

Diesel engines are the most popular type of compression ignition engines. Diesel engines introduce fuel directly into the combustion chamber. Diesel engines are very efficient because they provide high compression ratios without knocking, which is the premature detonation of the fuel mixture inside the combustion chamber. Because diesel engines introduce fuel directly into the combustion chamber, the fuel injection pressure must be greater than the pressure inside the combustion chamber. For liquid fuels such as diesel, the pressure must be significantly higher so that the fuel is atomized for efficient combustion.

Diesel engines are favored by industry because of their excellent combination of power, performance, efficiency and reliability. For example, diesel engines are generally much less expensive to operate compared to gasoline fueled, spark-ignited auxiliary engines, especially in commercial applications where large quantities of fuel are used. However, one disadvantage of diesel engines is pollution, such as particulate matter (soot) and NOx gases, which are subject to increasingly stringent regulations that require NOx emissions to be progressively reduced over time. To comply with these increasingly stringent regulations, engine manufacturers are developing catalytic converters and other after-treatment devices to remove $NO_x$ and other pollutants from diesel exhaust streams.

Improvements to diesel fuels are also being introduced to reduce the amount of sulfur in diesel fuel, to prevent sulfur from de-activating the catalysts of catalytic converters and to reduce air pollution. Research is also being conducted to improve combustion efficiency to reduce engine emissions, for example by making refinements to engine control strategies. However, most of these approaches add to the capital cost of the engine and/or the operating costs.

Other recent developments have been directed to substituting some of the diesel fuel with cleaner burning gaseous fuels such as, for example, natural gas, pure methane, butane, propane, hydrogen, and blends thereof. Since gaseous fuels typically do not auto-ignite at the same temperature and pressure as diesel fuel, a small amount of pilot diesel fuel may be introduced into the combustion chamber to auto-ignite and trigger the ignition of the gaseous fuel. Another approach for combusting gaseous fuel in a diesel engine involves introducing the gaseous fuel into the engine's intake air manifold at relatively low pressures. However, this approach has been unable to match the performance and efficiency of currently available diesel engines, particularly at high gas: diesel ratios. Thus, the simultaneous delivery of both diesel fuel and gaseous fuel to the combustion chambers, with the diesel acting as a pilot fuel, may be desirable.

One problem associated with delivering a gaseous fuel and a liquid diesel fuel for injection directly into the combustion chambers of an internal combustion engine is the need to maintain a well controlled pressure differential between the gas and diesel fuel rails. Because the response time of high pressure direct injection (HPDI) fuel systems can vary, it may be necessary to vent some gaseous fuel prior to combustion to maintain the required pressure difference between the two fuel rails. The gaseous fuel may be vented to the atmosphere, which wastes the gaseous fuel. U.S. Pat. No. 7,373,931 discloses a method of delivering both diesel and a gaseous fuel to a combustion chamber using a common drain rail connected to drain passages of both the gaseous fuel injection valve and the diesel fuel injection valve. The common drain rail leads to a liquid fuel storage vessel, which is equipped with a venting device to vent the gaseous fuel to the atmosphere or to a gaseous fuel storage tank.

SUMMARY OF THE DISCLOSURE

An engine system is disclosed that combusts both gaseous and diesel fuels. The system includes a diesel reservoir in communication with an internal combustion engine via a diesel rail. The system also includes a liquefied gaseous fuel reservoir in communication with the internal combustion engine via a gaseous fuel rail. The gaseous fuel rail and diesel fuel rail both are in communication with a pressure control device. The pressure control device measures the pressure differential between the gaseous and diesel fuel rails. If the pressure differential exceeds a desired range, the pressure control device vents gaseous fuel from the gaseous fuel rail to an auxiliary engine as fuel and the auxiliary engine converts the vented gaseous fuel to useful work.

In another aspect, an engine system that combusts both gaseous and diesel fuels is disclosed. The system includes a diesel reservoir coupled to a high pressure direct injection (HPDI) engine by a diesel rail. The system also includes a liquefied gaseous fuel reservoir in communication with a pump. The pump is used for pumping liquefied gaseous fuel through a first heat exchanger as a coolant that absorbs heat from the coolant for the auxiliary engine. The liquefied gaseous fuel flows from the first heat exchanger to a second heat exchanger that is coupled to the exhaust stream of the auxiliary engine, wherein the liquefied gaseous fuel also acts as a coolant for the exhaust stream by absorbing heat from the auxiliary engine coolant, which has already absorbed heat from the exhaust stream The gaseous fuel flows from the second heat exchanger to a gaseous fuel rail and from the gaseous fuel rail to the HPDI engine. The system also includes a differential control device linked to both the gaseous fuel and diesel rails for measuring a pressure differential between the gaseous fuel rail and the diesel fuel rail. The pressure control device may also be in fluid communication with the gaseous fuel rail. If the pressure differential between the gaseous fuel rail and the diesel rail exceeds a desired range, the pressure control device vents gaseous fuel from the gaseous fuel rail to the auxiliary engine. Finally, the auxiliary engine converts the vented gaseous fuel to useful work.

A method is disclosed for producing useful work from vent gas from an engine that combusts both a gaseous fuel and diesel. The method includes providing a diesel reservoir in communication with the diesel rail that is connected to an internal combustion (IC) engine. The method also includes providing a liquefied gaseous fuel reservoir in communication with a gaseous fuel rail that is connected to the IC engine. The method further includes providing communication between both the gaseous fuel and diesel rails and a pressure control device that also includes a valve for venting gaseous fuel to a passageway connected to an auxiliary engine. The method then includes detecting a pressure differential between the gaseous fuel and diesel rails and, if the pressure differential between the gaseous fuel rail and diesel rail exceeds a desired range, the pressure control device vents gaseous fuel from the gaseous fuel rail to the auxiliary engine. The method then includes combusting the vented gaseous fuel in the auxiliary engine and creating useful work from the combusting of the vented gaseous fuel.

In any one or more of the embodiments described above, the liquefied gaseous fuel may pass through a coolant side of the first heat exchanger that is coupled to coolant flow for the auxiliary engine for cooling the auxiliary engine and heating the liquefied gaseous fuel. Further, the liquefied gaseous fuel may pass through the coolant side of a second heat exchanger coupled to a coolant flow that has absorbed heat from an exhaust stream of the auxiliary engine for indirectly cooling the exhaust stream and further heating the liquefied gaseous fuel.

In any one or more of the embodiments described above, the system may include a pump disposed between the liquefied gaseous fuel reservoir and the auxiliary engine. The pump may receive liquefied gaseous fuel from the liquefied gaseous fuel reservoir and increase the pressure of the liquefied gaseous fuel before the liquefied gaseous fuel reaches the gaseous fuel rail.

In any one or more of the embodiments described above, the auxiliary engine is coupled electrically to a motor via a generator the motor may be used to drive the pump. The auxiliary engine may also mechanically or hydraulically drive the pump. The pump receives liquefied gaseous fuel from the liquefied gaseous fuel reservoir and increases the pressure of the liquefied gaseous fuel before the liquefied gaseous fuel reaches the gaseous fuel rail.

In any one or more of the embodiments described above, the auxiliary engine is coupled to a generator. The generator is coupled to a heater. The heater may be disposed between the liquefied gaseous fuel reservoir and the first heat exchanger.

In any one or more of the embodiments described above, the pressure control device may include a differential pressure sensor connected to both the gaseous fuel rail and the diesel rail for receiving pressure signals from both the gaseous fuel rail and diesel rail. The differential pressure sensor may also be linked to a controller. The controller may be linked to a pressure control module. The pressure control module may be in communication with the gaseous fuel rail and may include a valve for venting gaseous fuel from the gaseous fuel rail to the auxiliary engine. In a related embodiment, the controller may be an engine control module (ECM).

In any one or more of the embodiments described above, the auxiliary engine may be a spark ignited (SI) engine.

In any one or more of the embodiments described above, the gaseous fuel is selected from the group consisting of liquefied natural gas (LNG), butane, propane, ethane, hydrogen and mixtures thereof.

In any one or more of the methods described above, the methods may further include providing a first accumulator between the pressure control device and the auxiliary engine, wherein the gaseous fuel is vented to the first accumulator before it flows to the auxiliary engine. The method may also include providing communication between the liquefied gaseous fuel reservoir and the accumulator for delivering supplemental liquefied gaseous fuel to the accumulator. As a result, after the vented gaseous fuel and supplemental gaseous fuel are combusted in the auxiliary engine and when no gaseous fuel is currently being vented, only supplemental gaseous fuel is combusted in the auxiliary engine thereby enabling continuous operation of the auxiliary engine.

In any one or more of the embodiments described above, the auxiliary engine may be coupled to or linked to an electric, mechanical or hydraulic pump, a generator or another piece of peripheral equipment for performing useful work.

BRIEF DESCRIPTION OF THE DRAWINGS

FIG. 2 is a partial schematic view of the system shown in FIG. 1 illustrating an alternative means for generating useful work from the spark ignited auxiliary engine.

FIG. 3 is another partial schematic view of the system shown in FIG. 1 illustrating yet another alternative means for generating useful work from the auxiliary engine.

DETAILED DESCRIPTION

Figure 1:
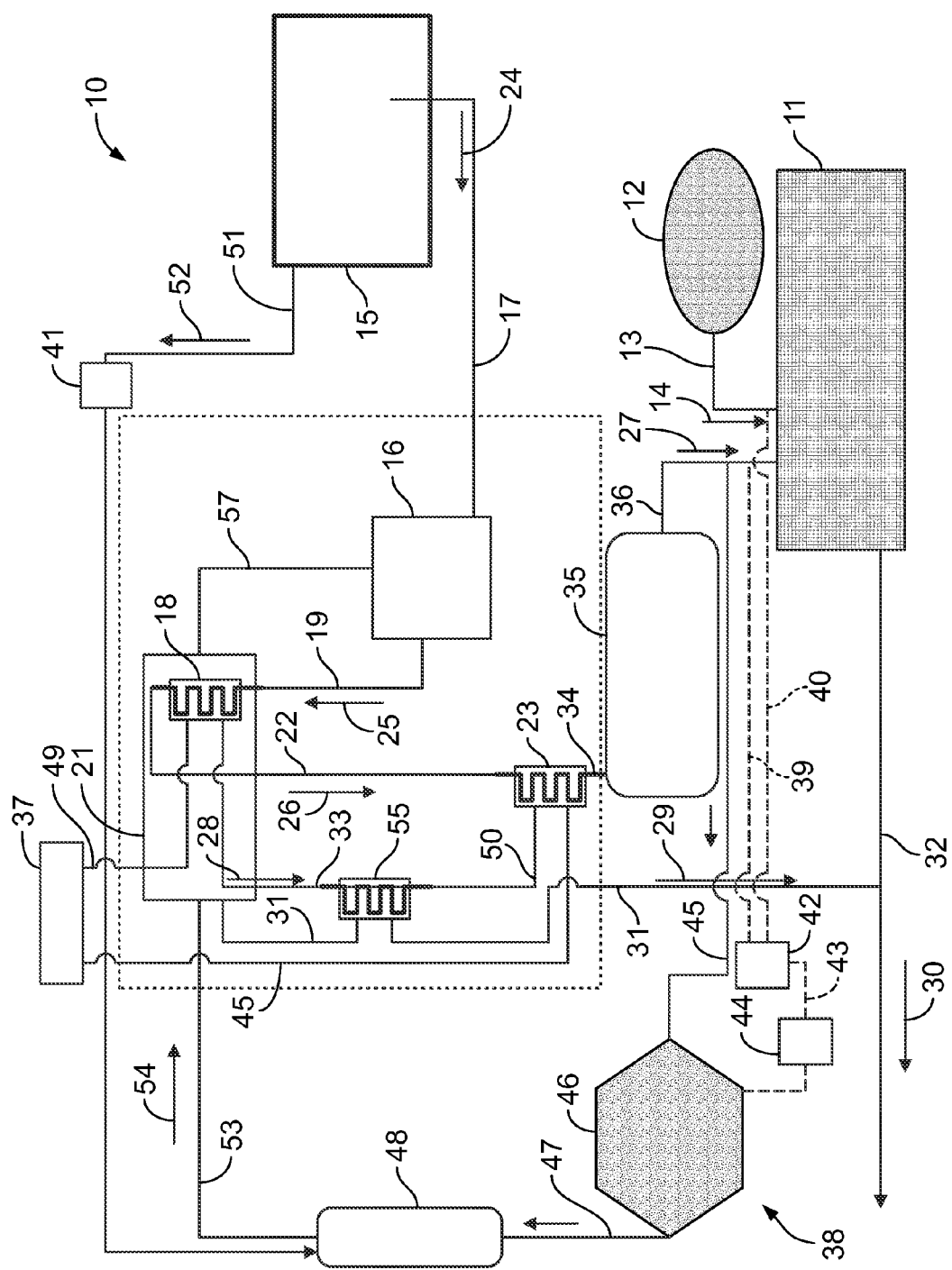
FIG. 1 schematically illustrates an engine system that burns two fuels, including a gaseous fuel or a fuel that is a gas at ambient temperatures, and a liquid fuel, such as diesel.

Turning to FIG. 1, a system 10 is disclosed that is capable of burning both a gaseous fuel as well as a liquid fuel, i.e., diesel. While this disclosure is primarily directed towards the use of high pressure direct injection (HPDI) engines 11, it is anticipated that the principles of this disclosure may be applicable to other internal combustion engines as well. Thus, the engine 11 may be an HPDI engine for burning both diesel and gaseous fuels or the engine 11 may be some other sort of internal combustion engine. Similarly, the auxiliary engine 21 may be a spark ignited (SI) engine 21 or any type of dual fuel engine.

While the specific examples disclosed herein will focus on diesel fuel as the liquid fuel. This disclosure is intended to cover the use of liquid fuels in general. Thus, the engine 11 is coupled to a diesel reservoir 12 via a diesel rail 13. While simplified, diesel flows from the reservoir 12, through the rail 13, in the direction of the arrow 14 and into a manifold (not shown) of the HPDI engine 11.

Similarly, the HPDI engine 11 is also connected to a liquefied gaseous fuel reservoir 15 which may be a reservoir of compressed gaseous fuel, or liquid gaseous fuel. The term "gaseous" as used in this disclosure to describe a fuel means that the fuel is a gas at typical ambient conditions but which is liquefied in the reservoir 15 and therefore must be heated and undergo a phase change from liquid to gas before it reaches the auxiliary engine 21. For example, the liquefied gaseous fuel contained in the reservoir 15, which may be a cryogenic tank, may be liquefied natural gas (LNG).

LNG consists primarily of methane, but it will be noted that other gaseous fuels can be used such as pure methane, butane, propane, hydrogen and blends thereof. For the sake of simplicity, the drawings will be described in terms of the flow of LNG and diesel, but the reader will note that this disclosure is not limited to the use of those to particular gaseous liquid fuels. The liquefied gaseous fuel reservoir 15 may be connected to a pump 16 by the passageway 17. Assuming the reservoir 15 contains cryogenic LNG, low pressure LNG is delivered to the pump 16 which increases the pressure of the LNG and delivers high pressure LNG to a first heat exchanger 18 by way of the passageway 19. The high pressure LNG passes through the first heat exchanger 18 where the LNG may absorb heat from the auxiliary engine 21 coolant delivered through the passageway 49 from the coolant reservoir 37. After passing through the coolant side of the first heat exchanger 18, the high pressure LNG proceeds through the passageway 22 to the coolant side of a second heat exchanger 23. The second heat exchanger 23 may be coupled to an exhaust coolant passageway 50 that carries coolant that has been heated by the exhaust stream passageway 31 in the heat exchanger 35. The direction of flow of the LNG is indicated by the arrows 24, 25, 26, 27 while the direction of flow of the exhaust through the passageways 31, 32 from the auxiliary engine 21 is indicated by the arrows 28, 29, 30.

Thus, low pressure LNG (or any liquefied gaseous fuel) is delivered from the reservoir 15 through the passageway 17 to the pump 16. The pump 16 increases the pressure of the low pressure LNG thereby causing high pressure LNG to flow in the direction of the arrow 25 and through the passageway 19 to the first heat exchanger 18 where the high pressure LNG is heated as it is used as a coolant for the engine 21. The heated high pressure LNG proceeds in the direction of the arrow 26 through the passageway 22 to the second heat exchanger 23 where the high pressure LNG is heated again as it is used to absorb heat from the coolant used to cool the exhaust passing through the passageway 31. The cooled exhaust passes through the passageway 31 before entering the primary exhaust passageway 32 as shown in FIG. 1.

As an alternative, the LNG may be heated by the exhaust stream only using just the heat exchangers 55 and 23 without using the heat exchanger 18. Further, exchanging heat with the exhaust may be eliminated and the LNG can be heated using only a single heat exchanger 18. And, of course, the LNG can be heated by both the engine 21 coolant in the heat exchanger 18 and the exhaust in the heat exchangers 55, 23.

Thus, the pump 16 converts the low pressure LNG from the reservoir 15 into a high pressure stream passing through the passageway 19. The warming of the fuel passing through the passageways 19, 22 may cause the LNG to change into a compressed natural gas (CNG) state (or a compressed gaseous fuel state) by the time it reaches the entry passageway 34 which leads to the accumulator 35. Warm, high pressure CNG is then delivered from the accumulator 35 through the gaseous fuel rail 36 before it is delivered to the manifold (not shown) of the HPDI engine 11.

HPDI fuel systems require a well-controlled pressure differential between the gaseous fuel rail 36 and the diesel rail 13. As the response time of each HPDI fuel system may vary from system to system or during use, it may be necessary to vent excess gas from the gaseous fuel rail 36 in order to keep the pressure differential between the gaseous fuel rail 36 and the diesel rail 13 within a predetermined range. Traditionally, such "vent" gas is simply vented to the atmosphere. However, as shown in FIG. 1, any gaseous fuel or CNG that is vented from the gaseous fuel rail 36 may be converted into useful work by the auxiliary engine 21.

Specifically, a pressure control device 38 is used to measure the pressure in the gaseous fuel rail 36 and the diesel rail 13. The pressures may be measured by sensors at the rails 36, 13 or small amounts of the pressurized fuels may be transmitted via the links 39, 40 which may be coupled to a differential pressure sensor 42. The differential pressure sensor 42 may be used to calculate the pressure differential, which is then communicated via the link 43 or wirelessly to a controller 44. The controller 44 may be a separate controller or may serve as the engine control module (ECM) of the machine. An additional line 45 may be provided to communicate vent gas from the gaseous fuel rail 36 to the pressure control module 46 of the pressure control device 38. The pressure control module 46 may include a valve for releasing vent gas to the passageway 47 and towards the accumulator 48. Because the system 10 does not vent gas continuously from the gaseous fuel rail 36, a supplemental source of gaseous fuel may be required for continuous operation of auxiliary engine 21. In that regard, a passageway 51 is disclosed which extends between the LNG reservoir 15 and the accumulator 48 as shown. Low pressure LNG will flow through the passageway 51 in the direction of the arrow 52 to the accumulator 48 where it expands to become CNG (or a compressed gaseous fuel). The vent gas plus the supplemental CNG is supplied to the auxiliary engine 21 through the passageway 53 as indicated by the arrow 54. The auxiliary engine 21 may perform a variety of useful work. As shown in FIG. 1, the auxiliary engine 21 is directly coupled to the pump 16 via the linkage or direct drive system 57. The engine 21 may also be electrically linked to the pump 16 via a generator (not shown) or hydraulically linked to the pump.

Specifically, turning to FIG. 2, the pump 116 may require an electric motor 58. The motor 58 may be driven by a generator 59 that, in turn, is powered by the auxiliary engine 21 via the linkage 157. The remaining elements in FIG. 2 may be identical to those of FIG. 1 and will not be discussed again in detail here.

Further, the auxiliary engine 21 may be used to power a generator 59 that is used to operate a heater 62 which ensures that the low pressure LNG passing through the passageway 17 and that is pumped to a higher pressure by the pump 16 is converted to a gaseous state prior to entering the first heat exchanger 18. Of course, the heater 62 may be placed in a variety of places and the embodiment of FIG. 3 is but a mere example.

INDUSTRIAL APPLICABILITY

Thus, an engine system is disclosed that can reduce emissions by combining a gaseous fuel source, such as natural gas, and a liquid fuel source, such as diesel. Emissions are improved as gaseous fuel sources generate less particulate matter emissions or $NO_x$. The disclosed system may include a diesel reservoir in communication with an internal combustion engine such as an HPDI engine via a high pressure diesel rail. A liquefied gaseous fuel reservoir may be provided, typically in a form of cryogenic LNG tank, that may be in communication with the HPDI engine via a gaseous fuel rail. The gaseous fuel rail and diesel rail may both be in communication with a pressure control device. The pressure control device measures the pressure differential between the gaseous fuel and diesel rails. For most HPDI engines or HPDI fuel systems, a relatively tight control over the pressure differential between the gaseous fuel rail and the diesel rail is necessary. After determining the pressure differential using the pressure control device, if the pressure differential exceeds a desired range, the pressure control device may vent gaseous fuel from the gaseous fuel rail to the auxiliary engine as fuel for the auxiliary engine. The auxiliary engine can then convert the vent gas into usable work.

Because the supply of vent gas may not be entirely consistent or continuous, a supplemental liquefied gaseous fuel passageway may be provided between the liquefied gaseous fuel reservoir and an accumulator disposed downstream of the pressure control device. In the accumulator, vent gas and supplemental liquefied gaseous fuel are mixed, the liquefied gaseous fuel is converted to compressed gaseous fuel and the combination vent gas and supplemental compressed gaseous fuel are delivered to the auxiliary engine as fuel. Combustion of the vent gas/supplemental compressed gaseous fuel in the auxiliary engine may be converted to work such as work to drive the pump that converts the low pressure liquefied gaseous fuel from the liquefied gaseous fuel reservoir into a high pressure liquefied gaseous fuel before it is delivered to the cooling system of the auxiliary engine which may include a heat exchanger. In the heat exchanger of the auxiliary engine cooling system, the liquefied gaseous fuel is heated and then may be delivered to yet another heat exchanger which may be coupled to the exhaust stream of the auxiliary engine. The exhaust stream from auxiliary engine warms the gaseous fuel again before it is delivered to an accumulator as warm high pressure liquefied gaseous fuel where it changes to gaseous fuel. The warm high pressure gaseous fuel may be delivered to the HPDI engine via the gaseous fuel rail.

As alternatives, the auxiliary engine may be used to drive a generator which may be used to operate a motor that is used to drive a pump or the auxiliary engine can be coupled to a generator that is used to operate a heater. The auxiliary engine may also be used to operate other peripheral equipment such as a generator, a hydraulic system or a mechanical system.

What is claimed is:

1. An engine system that combusts gaseous and diesel fuels, the system comprising:
    a diesel reservoir in communication with an internal combustion engine via a diesel rail;
    a liquefied gaseous fuel reservoir in communication with the internal combustion engine via a gaseous fuel rail;
    the gaseous fuel rail and diesel rail both being in communication with a pressure control device, the pressure control device measuring the pressure differential between the gaseous fuel and diesel rails;
    wherein if the pressure differential exceeds a desired range, the pressure control device vents gaseous fuel from the gaseous fuel rail to an auxiliary engine as fuel; and
    the auxiliary engine converting the vented gaseous fuel to useful work.

2. The system of claim 1 wherein the gaseous fuel passes through a coolant side of a first heat exchanger coupled to the auxiliary engine for cooling the auxiliary engine and heating the gaseous fuel.

3. The system of claim 2 wherein the gaseous fuel passes through a coolant side of a second heat exchanger coupled an exhaust stream of the auxiliary engine for cooling the exhaust stream and further heating the gaseous fuel.

4. The system of claim 1 further including a pump disposed between the liquefied gaseous fuel reservoir and the auxiliary engine, the pump receiving gaseous fuel from the liquefied gaseous fuel reservoir and increasing the pressure of the gaseous fuel before the gaseous fuel reaches the gaseous fuel rail.

5. The system of claim 1 wherein the auxiliary engine is coupled to a generator, the generator coupled to a motor, the motor coupled to a pump that receives gaseous fuel from the liquefied gaseous fuel reservoir and increases the pressure of the gaseous fuel before the gaseous fuel reaches the gaseous fuel rail.

6. The system of claim 2 wherein the auxiliary engine is coupled to a generator, the generator coupled to a heater, the heater being disposed between the liquefied gaseous fuel reservoir and the first heat exchanger.

7. The system of claim 1 wherein the pressure control device includes a differential pressure sensor connected to both the gaseous fuel rail and diesel rail for receiving pressure signals from the gaseous fuel rail and diesel rail, the differential pressure sensor also linked to a controller, the controller linked to a pressure control module, the pressure control module in communication with the gaseous fuel rail and including a valve for venting gaseous fuel from the gaseous fuel rail to the auxiliary engine.

8. The system of claim 7 wherein the controller is an engine control module (ECM).

9. The system of claim 7 further including a first accumulator disposed between the pressure control module and the auxiliary engine for accumulating vented gaseous fuel upstream of the auxiliary engine, the first accumulator in communication with a source of gaseous fuel disposed upstream of the gaseous fuel rail to provide supplemental gaseous fuel with the vented gaseous fuel to the auxiliary engine.

10. The system of claim 7 further including a first accumulator disposed between the pressure control module and the auxiliary engine for accumulating vented gaseous fuel upstream of the auxiliary engine, the first accumulator in communication with the liquefied gaseous fuel reservoir to provide supplemental gaseous fuel with the vented gaseous fuel to the auxiliary engine.

11. The system of claim 1 wherein the gaseous fuel is selected from the group consisting of liquefied natural gas (LNG), butane, propane, ethane, methane, hydrogen and mixtures thereof.

12. An engine system that combusts a gaseous fuel and diesel, the system comprising:
    a diesel reservoir coupled to a high pressure direct injection (HPDI) engine by a diesel rail;
    a liquefied gaseous fuel reservoir in communication with a pump, the pump for pumping gaseous fuel through a first heat exchanger as a coolant for an auxiliary engine, the gaseous fuel flowing from the first heat exchanger to a second heat exchanger coupled to an exhaust stream of the auxiliary engine wherein the gaseous fuel acts a coolant for the exhaust stream;
    the gaseous fuel flowing from the second heat exchanger to a gaseous fuel rail and from the gaseous fuel rail to the HPDI engine;
    a differential pressure control device linked to both the gaseous fuel and diesel rails for measuring a pressure differential between the gaseous fuel rail and the diesel rail, the pressure control device also in fluid communication with the gaseous fuel rail, wherein if the pressure differential between the gaseous fuel rail and the diesel rail exceeds a desired range, the pressure control device vents gaseous fuel from the gaseous fuel rail to the auxiliary engine; and
    the auxiliary engine converting the vented gaseous fuel to useful work.

13. The system of claim 12 wherein the auxiliary engine is coupled to a generator, the generator is coupled to a motor, the motor is coupled to the pump.

14. The system of claim 12 wherein the auxiliary engine is coupled to a generator, the generator coupled to a heater, the heater being disposed between the pump and the first heat exchanger.

15. The system of claim 12 wherein the pressure control device includes a differential pressure sensor connected to both the gaseous fuel rail and diesel rail for receiving pressure signals from the gaseous fuel rail and diesel rail, the differential pressure sensor also linked to a controller, the controller linked to a pressure control module, the pressure control module in communication with the gaseous fuel rail and including a valve for venting gaseous fuel from the gaseous fuel rail to the auxiliary engine.

16. The system of claim 15 wherein the controller is an engine control module (ECM).

17. The system of claim 12 further including a first accumulator disposed between the pressure control device and the auxiliary engine for accumulating vented gaseous fuel upstream of the auxiliary engine, the first accumulator in communication with the liquefied gaseous fuel reservoir to provide supplemental gaseous fuel with the vented gaseous fuel to the auxiliary engine.

18. The system of claim 12 wherein the gaseous fuel is selected from the group consisting of liquefied natural gas (LNG), butane, propane, ethane, methane, hydrogen and mixtures thereof.

19. A method of producing useful work from vent gas from an engine system that combusts a gaseous fuel and diesel, the method comprising:
- providing a diesel reservoir in communication with a diesel rail that is connected to an internal combustion (IC) engine;
- providing a liquefied gaseous fuel reservoir in communication with a gaseous fuel rail that is connected to the IC engine;
- providing communication between both the gaseous fuel and diesel rails and a pressure control device that also includes a valve for venting gaseous fuel to a passageway connected to an auxiliary engine;
- detecting a pressure differential between the gaseous fuel and diesel rails;
- if the pressure differential between the gaseous fuel rail and the diesel rail exceeds a desired range, the pressure control device vents gaseous fuel from the gaseous fuel rail to the auxiliary engine;
- combusting the vented gaseous fuel in the auxiliary engine and creating useful work from the combusting of the vented gaseous fuel.

20. The method of claim 19 further including
- providing an accumulator between the pressure control device and the auxiliary engine, wherein the gaseous fuel is vented to the accumulator before it flows to the auxiliary engine;
- providing communication between the liquefied gaseous fuel reservoir and the accumulator for delivering supplemental gaseous fuel to the accumulator;
- wherein vented gaseous fuel and the supplemental gaseous fuel are combusted in the auxiliary engine and when no gaseous fuel is being vented, only supplemental gaseous fuel is combusted in the auxiliary engine thereby enabling continuous operation of the auxiliary engine.

21. The method of claim 20 wherein the auxiliary engine is coupled to one of a pump and a generator for performing useful work.

\* \* \* \* \*